United States Patent [19]

McNeely et al.

[11] 3,822,903

[45] July 9, 1974

[54] MULTI-CORE UNDERGROUND CONDUIT-MANHOLE SYSTEM

[75] Inventors: Arthur O. McNeely, Redondo Beach; Wiley T. Kennedy, Santa Ana; Paul Huska, Los Angeles, all of Calif.

[73] Assignee: MacKenhus Corporation, Santa Ana, Calif.

[22] Filed: Mar. 31, 1972

[21] Appl. No.: 239,904

[52] U.S. Cl........ 285/137 R, 285/294, 285/DIG. 16
[51] Int. Cl............................................ F16l 39/00
[58] Field of Search .... 285/294, 297, 423, DIG. 16, 285/137 R; 130/111, 112, 113

[56] References Cited
UNITED STATES PATENTS
| | | | |
|---|---|---|---|
| 2,498,831 | 2/1950 | Veitch | 285/DIG. 16 |
| 2,785,910 | 3/1957 | Munger | 285/297 X |
| 3,152,820 | 10/1964 | Giampa et al. | 285/DIG. 16 |
| 3,649,055 | 3/1972 | Nilsen | 285/DIG. 16 |
| 3,650,549 | 3/1972 | Pepper | 285/DIG. 16 |

*Primary Examiner*—Dave W. Arola

[57] ABSTRACT

The joinder of ducting such as underground systems of multi-tube form, comprised of a coupler assembly receiving the complementary ends of one or more continuing duct sections and bonded thereto and the sections thereby connected together by means of liquid material hydraulically applied under pressure to enter an annulus around each duct to be coupled, and wherein the application of and solidification of said material purges each said annulus while adhereing to bond the coupler and ducts and thereby hermetically sealing each joinder; and the system being characterized by its adaptability to an array consisting of a multiplicity of ducts cooperatively arranged by means of a saddle having a manifold simultaneously distributing said liquid material to the coupler connections; there being process support means and a kit involved in the method of coupling by which the bonding material is hydraulically injected with heat applied as required.

20 Claims, 15 Drawing Figures

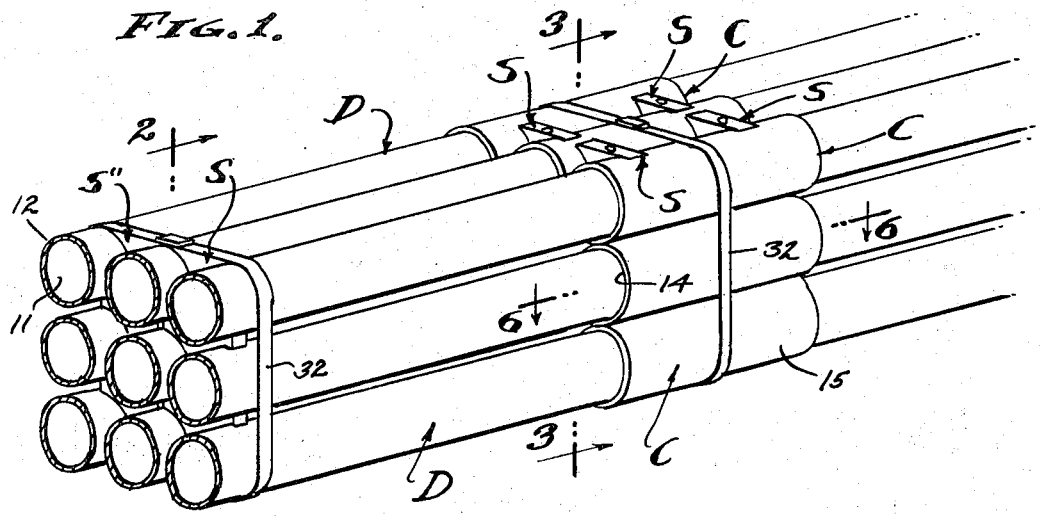
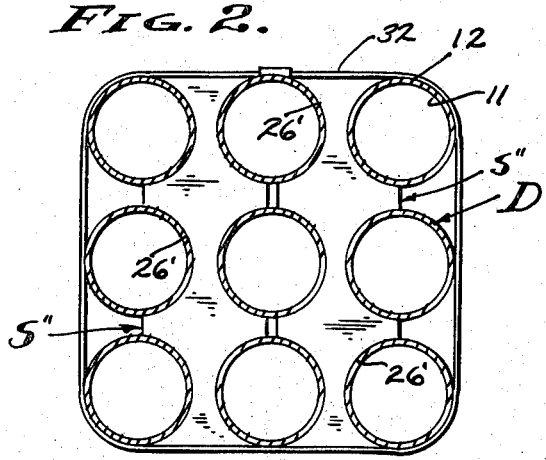
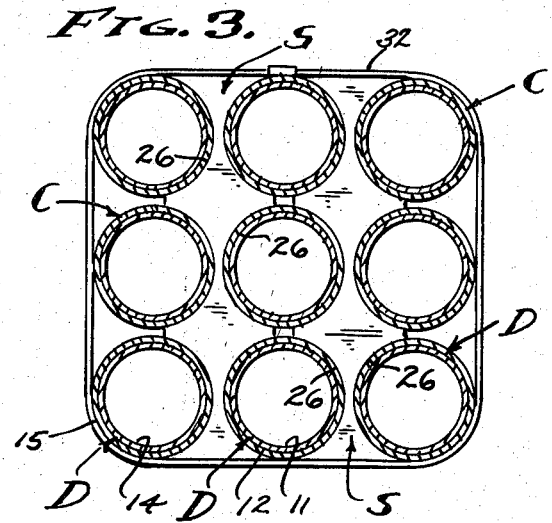
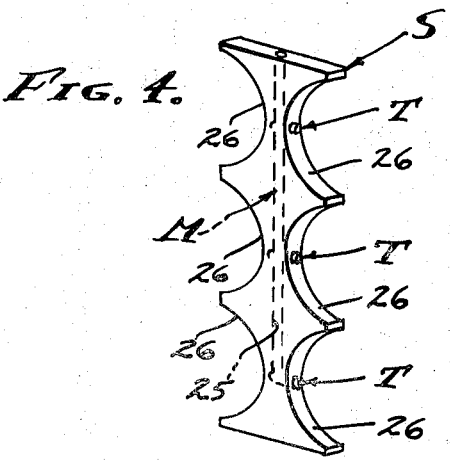
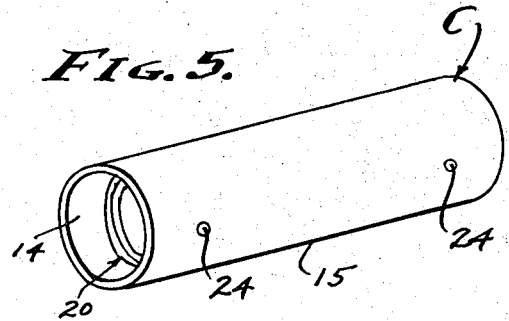

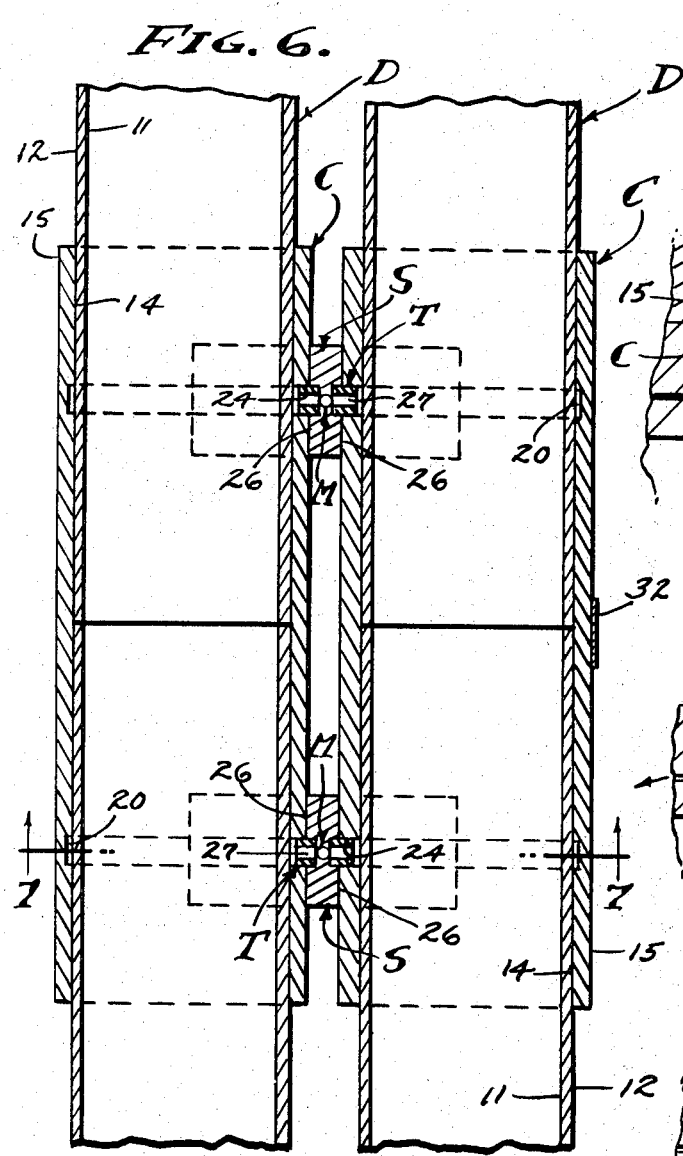
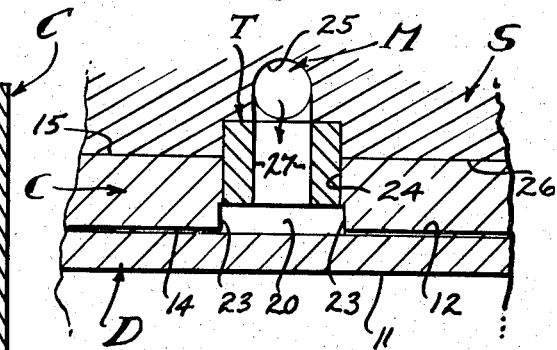
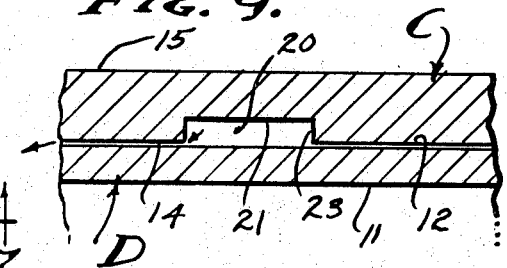
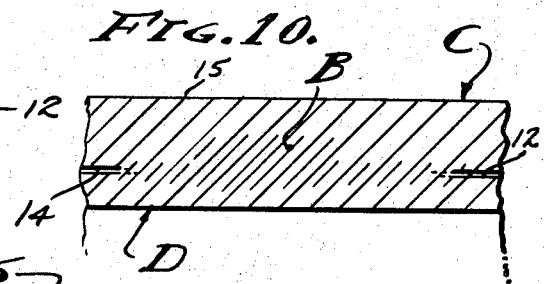
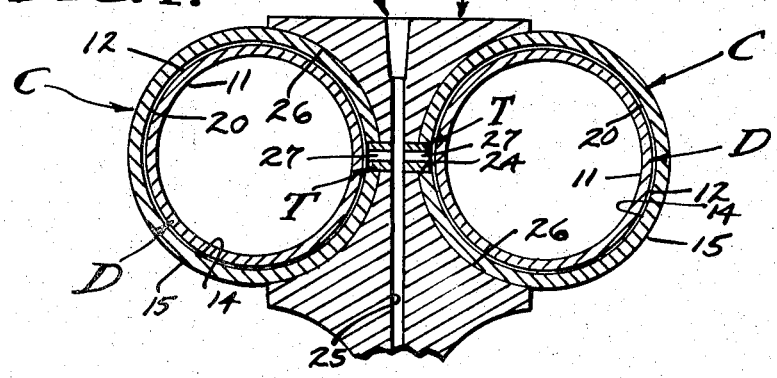

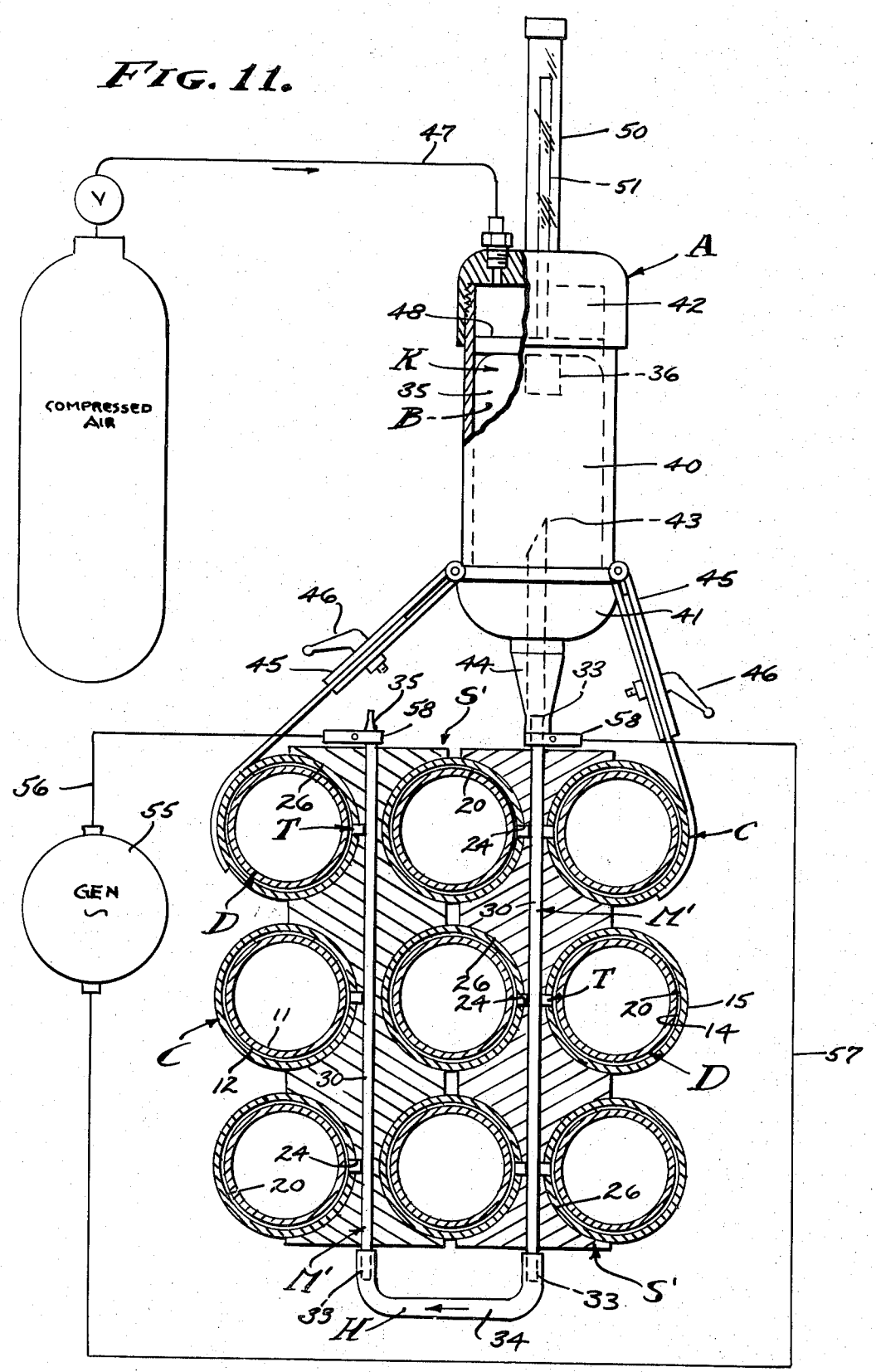

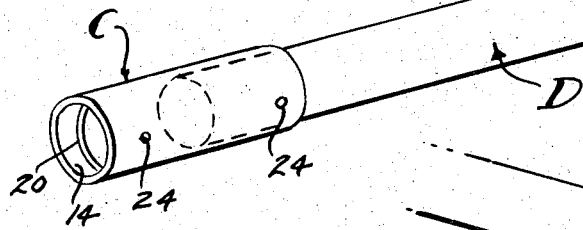
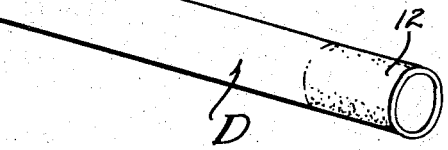
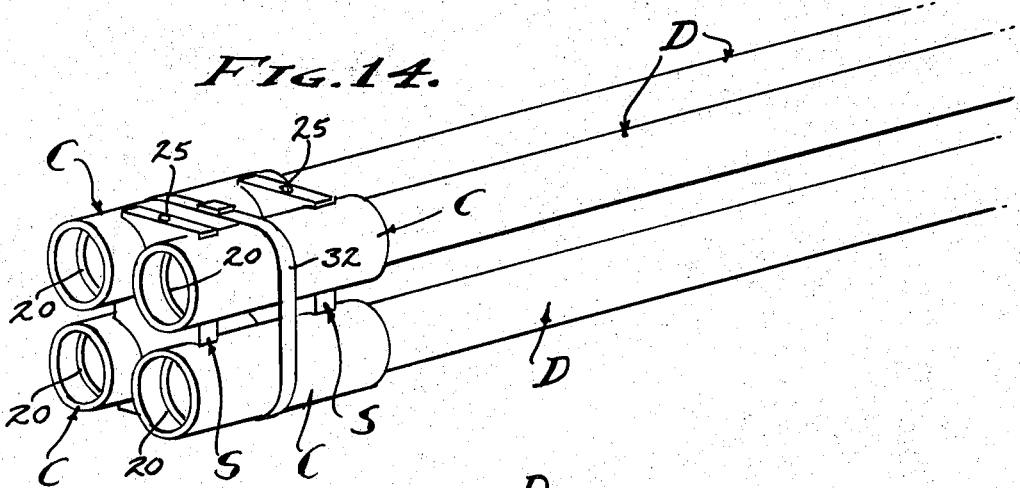
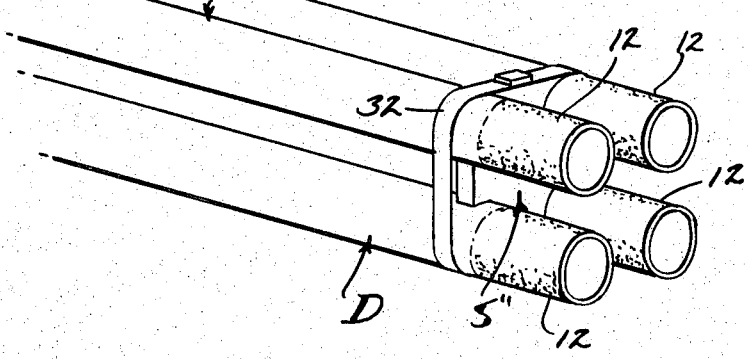

3,822,903

MULTI-CORE UNDERGROUND CONDUIT-MANHOLE SYSTEM

Reference is made to Disclosure Document Ser. No. 3,353 filed Nov. 2, 1970, which describes fundamentally the concepts herein disclosed.

BACKGROUND

The underground installation of electrical conductors requires the exclusion of moisture and in practice waterproof tubes with complicated sealed connections are employed to extend from station to station. The cross sectional configuration of such ducts can vary widely and the stations can be in the nature of vaults such as "manholes" and the like. For example, the ducts that are commonly employed for housing electrical power transmission lines are polygonal or round cross sections of impervious material cemented into the intermediate couplers and into the terminal vaults; various mechanical sealing methods being used to ensure water tightness. The materials heretofore employed are, generally speaking, heavy, hard and breakable substances; and for example, cement such as concrete which is fracturable and not altogether impervious to water. Moreover, the placement of ducts such as tile is time consuming when motar and cement is relied upon, and all of which must be followed by inspections in order to determine the effectiveness of the installation. As a result, the usual installation of electrical power transmission lines underground is tedious and costly, it being a general object of this invention to provide a ducting system which can be expediently installed, producing an impervious hermetically sealed high reliability installation for accommodating the passage therethrough of electrical conductors as may be required.

FIELD OF INVENTION

The fluid tight joinder of wall sections is a reoccuring problem and the various methods of overlapped and/or telescoped coupling with or without sealing members are costly to install. Also, the use of materials in the formation of walls has its limiting factors, and to the end that wall couplings are usually suseptible to leakage. It is therefore an object of this invention to provide compatability in the materials forming the wall sections and the material of the seal established therebetween. With the present invention, it is the use of thermo setting plastics which is utilized throughout and which bond together with features that assure a hermetically sealed joint.

The selective coupling together of one or more duct sections is usually a time consuming operation, since the ducts are usually individually handled and sealed with the couplings provided therefor. It is an object herein to simultaneously join a multiplicity of ducts in complementary end to end relation in a single sealing operation which is effective to join all tube sections involved. With the present invention, a coupling is provided at every tube joinder and a saddle cooperatively associated with the multiplicity of tubes, there being a manifold incorporated in the saddle and simultaneously directing liquid bonding material into embracing channels where it solidifies in fused engagement with the ducts and coupling members.

The expedient assembly of multi-tube forms is made possible with the present invention, it being an object to provide for the universal application of a coupling member by the use of a saddle member which includes the above mentioned manifold and which cooperatively orients the multiplicity of ducts. With the present invention, the ducts are embraced within the confines of the coupling member which is in fluid communication with the manifold of the saddle, so that a single application of bonding material suffices for each coupling installation.

The torsional stability of an array comprised of a multiplicity of ducts is made possible by the present invention, it being an object to rotatively locate each duct member with respect to its coupling member and to the saddle member that arranges the mulitiplicity of couplings. With the present invention, the manifolded communication with each coupling member is assured by an indexing tube in the saddle member that registers with a fluid transfer port in the coupling member, in each instance; whereby fluid communication is assured during the coupling process and whereby the fused assembly cannot be finished in a warped condition.

It is an object to provide the fused joinder of duct members with a coupling member, wherein fluid displacement in the process of joinder purges the interstices between members and assures a hermetic seal when fusion occurs. With the present invention, the relative viscosity of the liquid bonding material (when fluid) is far greater than the surrounding atmosphere, and a seal channel with opposite dams establishes interstices between the members, exhausting air while containing the pressured bonding material; resulting in a high reliability seal inherent with the application of a full displacement volume of sealing material. In practice, a measured volume of fluid sealing material is applied in each instance.

It is another object of Jhis invention to provide process support equipment and the bonding material in kit form for use thereby and containing in each instance a proper measured volume for purging and establishing the seal between the mechanical interengagement of members.

SUMMARY OF INVENTION

This invention relates to the joinder of multi-tubular duct sections that are hermetically sealed together in chemical engagement. The joinder thereof is permanent in nature and utilizes a thermo setting bonding material that is hydraulically applied in a single operation so as to complete the coupling process simultaneously with respect to the entire multiplicity of couplings involved. In its basic form, this invention involves, generally, the joinder of like and/or identical duct sections referred to herein as duct members D, a coupling member C telescopically engaged over the abutted end portions of said duct members, and a body of initially fluid bonding material B (see FIGS. 10 and 11) that is introduced hydraulically as a liquid and subsequently fused with the members D and C while solidifying so as to bond hermetically and seal the chemically connected two members D and C. The basic members B, C and D are cooperatively oriented for the coupling process by means of a saddle S (and S') that is provided in accordance with this invention to interrelate a multiplicity of couplings in an array that is chemically bonded and/or fused into a hermetically sealed and homogenous structure having mechanical continuity that is impervious to moisture and is essentially air and/or pressure tight.

A feature of the invention is the manifold M and its index tubes T that rotatively key the individual duct members D and conduct the liquid bonding material B thereto. In the one form of the invention (see FIG. 11), the manifold M' is a semi-conductor of electrically resistant material coupled by a header H and to which voltage is applied for a time increment that is linear with the flow of amperage therethrough with a resultant rise in temperature and used when ambient temperature is low; and thus the bonding area of the structure is warmed to the optimum temperature for resin polymerization, when making installation in low temperature environments. In carrying out this inventive process, support means A in the form of a liquid pump receives a kit K of bonding material B and supplies it under suitable pressure into the manifold M or m', said process support means A being universally adapted to the various arrays of ducts, as circumstances require.

DRAWINGS

The various objects and features of this invention will be fully understood from the following detailed description of the typical preferred forms and applications thereof, throughout which description reference is made to the accompanying drawings, in which:

FIG. 1 is a perspective view, the near most end being a transverse section, illustrating an array of tubular duct members coupled hermetically by means of the system of this invention.

FIGS. 2 and 3 are enlarged sectional views taken as indicated by lines 2—2 and 3—3 in FIG. 1.

FIG. 4 is a perspective view of the manifolded saddle which characterizes the present invention.

FIG. 5 is a view of the ported coupling member which characterizes the present invention.

FIG. 6 is an enlarged fragmentary sectional view of a portion of the coupling system and taken substantially as indicated by line 6—6 in FIG. 1.

FIG. 7 is a transverse section taken as indicated by line 7—7 in FIG. 6.

FIGS. 8, 9 and 10 are enlarged detailed sectional views illustrating respectively, the liquid application through the manifold, the displacement of air from the joint, and the chemical connection established by the system.

FIG. 11 is an illustration of the process support means applied to the coupling system, including the chemical kit and the several power means for effecting installation.

FIG. 12 is a perspective view of a prepared duct and coupling assembly, showing the female end, and FIG. 13 is a perspective view showing the male end thereof.

FIG. 14 is a perspective view of a prepared array of ducts and coupling assemblies combined with the saddle which characterizes the present invention and showing the female ends, and FIG. 15 is a perspective view of the male ends thereof.

PREFERRED EMBODIMENT

The duct members D are moisture impervious tubes of round cross section and of substantial lengths. These tubes are normally straight and for example have an inside diameter of 4 inches with one-eighth inch walls. In practice, the tubes are made of resin impregnated fibers, commonly known as "fiberglas" and which is water proof and impervious to normal exposure as when buried in the ground. For example, the wall cross section is comprised of inner and outer wrappings of woven glass fibers between which there is a core of glass fiber roving. A spirally wound filament or thread encases the lamination, and all of which is impregnated fully with a thermo setting polyester resin that is cured through catalytic action and the application of heat for a period of time, whereby the duct member D is formed into a rigid straight tube of uniform diameter such as to be cut to lengths as circumstances require. Thus, the members D are characterized by inner and outer walls 11 and 12 regardless of the cross sectional configuration employed. It is to be understood that the duct members D can be formed or cured into bent formations for turning corners and/or for the transposition of conductors as required.

The coupling members C are moisture impervious tubes of round cross section and of short length and of a diameter to slide over the end portions of abutted duct members D respectively. These tubes are straight and for example have an inside diameter of 4¼ inches plus, and a three-sixteenths inch wall. Like the members D, these tubes are made of resin impregnated fibers commonly known as "fiberglas" and which is waterproof and impervious to exposure as when buried in the ground. For example, the wall cross section is comprised of inner and outer wrappings of woven glass fibers between which there is a core of glass fiber roving. A spirally wound filament or thread encases the lamination, and all of which is impregnated fully with a thermo setting polyester that is cured through catalytic action and the application of heat for a period of time, whereby th coupling member C is formed into a rigid straight tube of uniform diameter subject to being cut to short lengths so as to telescopically engage over the end portions of abutted members D, a distance equal to several diameters thereof as shown.

With this invention, the clearance between the outside diameter 12 of member D and the inside diameter 14 of member C is such as to permit a clearance fit or freedom as distinguished from surface to surface engagement or sliding force fit. Thus, there is an annular interstice intermediate the diameters 12 and 14 (see FIG. 9), although the two diameters can touch at various places, and to the end that air will readily pass for exahust from between the two diameter walls 12 and 14.

In accordance with this invention, a sealing channel 20 is provided in the formation of the members C and D, for the reception of the bonding material B hydraulically applied to chemically fuse between said two members. In the preferred form, channel 20 is formed into the inner diameter wall 14 of coupling member C and thereby encompasses the outer diameter wall 12 of duct member D, being in open communication with the interstice or annulus between the said two members. A feature of the invention is the provision of a fluid transfer port 24 opening radially through the walls 14–15 of member C, and communicating into channel 20 at the bottom 21 thereof between its opposite side walls 22 and 23 thereby establishing opposite dams. In practice, the channel 20 is spaced inwardly from and between the terminal ends of the telescoped portions of members C and D, respectively as shown. Also, the terminal abutted ends of the continuing duct members D are in a transverse plane midway between opposite ends of said coupling member C.

In carrying out this invention, one end of each duct section D is initially provided with a coupling member C installed thereon as above described, by means of hydraulically introducing fluid bonding material B through port 24 and into the channel 20 displacing air therefrom through the annular interstices at both sides of channel 20 between the two members. The bonding material is an adhesive and preferably a thermo setting polyester resin and which is waterproof and impervious to normal exposure under ground. For example, the material B is a resin that polymerizes with the passage of a predetermined length of time and thereby solidifies while fusing to the confining walls of the members C and D. The viscosity of the liquid bonding material B is relatively high as compared with the viscosity of air, and consequently the introduction of fluid material B into the channel 20 displaces the fluid atmosphere therefrom through the aforementioned interstices between the two members being connected. The high viscosity liquid bonding material B is captured between the two dam walls 22 and 23, and consequently a hermetic seal is ensured between the two members C and D.

With the above described installation of coupling member C onto the duct member D, a female socket is provided at the one end of said duct member (see FIGS. 12 and 14) while the other end remains as a male projection (see FIGS. 13 and 15). Thus, a multiplicity of duct sections prepared as herein specified can be coupled one into the other, the aforementioned bonding process of introducing fluid bonding material B through the fluid transfer port 24 and into channel 20 and permitted to solidify in adhered and/or fused engagement with members C and D respectively, hermetically seals the joinder.

In accordance with this invention, a multiplicity of like duct members D prepared with the coupling members C are to be simultaneously installed by means of interconnecting the same while they are hermetically sealed. To this end we provide the saddle S characterized by its manifold M and plurality of indexing tubes T for simultaneously introducing fluid bonding material B in liquid form into the channel 20 of each coupling member C.

The saddle is essentially a spreading device that maintains a uniform on-center spacing of duct members D, so that they are arranged in a parallel array. Like the members C and D, the saddle S is made of a solid plastic or resin impregnated fiberous material, such as "fiberglas" and which is waterproof and impervious to normal exposure when buried in the ground. In practice, the saddle S is injection or pressure molded of a resin system such as a polyester resin whereby the members C, D and S are all of compatible materials subject to being fused with a common bonding material B. Thus, it is contemplated that the saddle S accommodate and position two or more duct members D, and involves basically one or more pairs of oppositely faced seats 26, there being an indexing tube T centered at the bottom of each of the seats. Each saddle S is a modular unit for example with three pairs of seats 26 as shown, and they can be stacked into a multiple complex as circumstances require.

The manifold M is a gallery or passage 25 that extends through the saddle units S with a lateral opening 27 at each seat 26. The passage 25 is formed in the saddle body with an opening at the surface thereof for receiving the pressured application of fluid bonding material B. In practice, the passage 25 of manifold M is open at its upper end and adapted (a tapered socket) to couple with the support means A. In accordance with this invention, the lateral openings 27 of manifold M are established by the indexing tubes T, and each of which projects so as to enter into a fluid transfer port 24 of the coupling member C received by the seat 26 complementary thereto. That is, the indexing tubes T are fluid transferring sleeves that seat into the openings 27 and projecting from the seats 26 to enter the ports 24, thereby rotatably positioning the couplings C and saddles S, while bonding material B is introduced simultaneously into and through all connecting channels 20. A strap 32 or the like ties the saddle unit or units S together with the couplings C captured in the seats 26, and with duct members D arranged in a parallel array.

Referring now to FIG. 11 of the drawings and its showing of a modified saddle S' and heated manifold M', the passage is established by a metallic tubing 30 of determined electrical resistance. The tubing is normally open at its upper and lower ends, and the tubings 30 of a plurality of saddles S' are adapted to be connected in series continuity with respect to both fluid conduction and electrical conduction. To these purposeful ends the adjacent open ends of the tubings 30 are connectable and are shown in the form of projecting nipples 33 connected by an electrical conductive pipe or hose 34 a tight pressed joinder thereof being indicated. In practice, the metal tubings 30 are maleable and the terminal end of the effective manifolding is pinched as at 35, the opposite end remaining open for receiving bonding material B. Notice the selective use of indexing tubes T in FIG. 11, wherein the said tubes are deleted from the right side of the left hand saddle S'; the ducts D therein being supplied with bonding material from the right hand saddle, for the reason that there is a single transfer port 24 at each end of the couplings C.

The process supporting means A in the form of a liquid pump is provided to receive the kit K of bonding material prepared for the particular complex of couplings involved. Firstly therefore, the kit K is charged with the volume of bonding material B required for the complete occupancy of the manifold M and multiplicity of channels 20 involved with each installation. As shown, the kit K involves a collapsible tube or bag 35 of resin into which a setting agent is broken and/or released from a frangible sack 36 within said bag; the bag and sack being precharged with the required volume of liquid bonding material. Secondly, the process support means A comprises a cylinder 40 closed by a base 41 and by a releasable head 42. The base 41 has an injector 43 that opens into the cylinder 40 with a tubular knife 44 that pierces the bag 35 and with a nozzle 44 that mates with the projecting upper end of manifold M to seal therewith and transfer liquid bonding material into the saddles S and chambers 20.

The base 41 has clamp arms 45 at opposite sides thereof and swiveled on spaced parallel axes, the arms having hooked ends to embraceably engage with the duct members D at opposite sides of the complex, thereby to draw the means A tightly onto said complex when said arms 45 are adjustably lengthened or shortened by lock means 46. The releasable head 42 provides for opening of the cylinder 40 for the reception of and removal of the bonding kit K, and air under pressure is applied through a pneumatic connection 47 so as to motivate a piston 48 that depresses the bag 35 so as to pressurize the bonding material for its ejection through the nozzle 44. A transparent indicator tube 50 accommodates a piston rod 51, said tube being closed and permitting visible notice of the depleating process of emptying the said bag 35 into the manifold M and communicating channels 20. The said process means A is removed from one coupling complex to another, and in each instance applies a prepared kit K comprised of the proper volume of bonding material B into which the setting agent has been released.

The metallic manifold tube 30 serves as a heater when electrical voltage is applied thereto from a power source such as a generator 55, being made of determined electrical resistivity. For example, the conductivity of tube 30 is such as to take a 100 ampere load for a time increment linear with temperature, and acts as a conductor or heating element so as to warm the bonding area from the lower range of resin polymerization to a temperature well above any sub zero installation condition. As shown, a pair of electrical leads 56 and 57 extend from the generator 55 to opposite end nipples 33 of the manifold M' and connected thereto by clamps 58.

From the foregoing, it will be seen that we have provided a versitile system for arranging ducts in multiple arrays, as may be required. In practice, the duct members D are manufactured in continuous lengths by the method of "pultrusion" in apparatus especially adapted therefor; and the continuous production of member D is cut into sections and each of which is characterized by its imperforate tubular wall. The coupling members C are manufactured by the same "pultrusion" process, or other suitable processes such as by injection molding; each being a substantially short tubular section also characterized by its imperforate wall punctuated only by the fluid transfer ports 24. Further, the inner diameter wall 14 of each coupling member C is provided with the spaced sealing channels 20, one channel for each duct member D to be joined therewith. The saddle units S are manufactured by injection molding or the like and are assembled with the ducts D at intervals along the array, preferably at the coupling ends of each array, as shown. It is to be understood that additional saddles S'' (see FIG. 2) can be employed to spread the duct members at positions therealong spaced from the joinder effected by the coupling members C. The assembly of duct members D and coupling member C secured by a strap 32 extablishes the array of ducts characterized by a group of female openings at one end and by a group of complementary male projections at the other end; and it is these units which are installed in end to end telescopic engagement and connected together hermetically by means of the hydraulic injection of adhesive or fuseable bonding material B, all as hereinabove described.

Having described only a typical preferred form and application of our invention, we do not wish to be limited or restricted to the specific details herein set forth, but wish to reserve to ourselves any modifications or variations that may appear to those skilled in the art:

We claim:

1. The combination of at least two parallel duct members of tubular cross section and each having inner and outer walls, a multiplicity of coupling members of tubular cross section having an inner wall and one engaged telescopically over each duct member, there being an annular interstice spacing between the inner wall of each coupling member and other wall of the duct member surrounded thereby, a sealing channel formed by the configuration of the inner coupling member wall and outer wall of the complementary duct member at the terminal end portion thereof with the interstice spacing in open communication therewith between the said members, a saddle member with a seat receiving and positioning each coupling member and duct member telescopically engaged therein and having a manifold with a tube opening at each seat, and bonding material between the duct members and coupling members and injected as a fluid therebetween via a fluid transfer port through each coupling member opening from the manifold tube at the seats and into the sealing channels and subsequently hardened between each coupling member and duct member surrounded thereby.

2. The combined duct members, coupling members and saddle member as set forth in claim 1 wherein the liquid bonding material injected into the manifold and through the fluid transfer ports fully occupies each of said sealing channels.

3. The combined duct members, coupling members and saddle member as set forth in claim 1 wherein the liquid bonding material combined with a setting agent injected into the manifold and through the fluid transfer ports fully occupies each of said sealing channels and subsequently hardens and adheres to and between each coupling member and duct when telescopically engaged therein.

4. The combined duct members, coupling members and saddle member as set forth in claim 1 wherein the duct members and coupling members are made of fuseable materials and the liquid bonding material injected into the manifold and through the fluid transfer ports fully occupies each of the said sealing channels and is fuseable with the materials of the duct and coupling members.

5. The combined duct members, coupling members and saddle member as set forth in claim 1 wherein the duct members and coupling members are made of fuseable materials and the liquid bonding material combined with a setting agent injected into the manifold and through the fluid transfer ports fully occupies each of the said sealing channels and is fused with the materials of the duct and coupling members.

6. The combined duct members, coupling members and saddle member as set forth in claim 1 wherein the tubes opening from the manifold at each seat in the saddle member project into the fluid transfer port opening there into and indexes the rotative positions of the duct member seated therein.

7. The combined duct members, coupling members and saddle member as set forth in claim 1 wherein the manifold is of electrically resistive material to heat the surrounding area when electrical current is passed therethrough.

8. The combined duct members, coupling members and saddle member as set forth in claim 1 wherein the saddle member is of modular form comprised of pairs of seats for the positioned reception of coupling members and duct members telescopically engaged.

9. The combined duct members, coupling members and saddle member as set forth in claim 1 wherein the saddle member is of modular form comprised of oppositely faced pairs of seats for the positioned reception of coupling members and duct members telescopically engaged therein.

10. The combined duct members, coupling members and saddle member as set forth in claim 1, wherein the saddle member is of modular form comprised of oppositely faced pairs of seats for the positioned reception of coupling members and duct members telescopically engaged therein, wherein the tubes opening from the manifold at each seat in the saddle member project into the fluid transfer port opening there into and indexes the rotative position of the duct member seated therein, and wherein the duct members and coupling members are made of fuseable materials and the liquid bonding material combined with a setting agent injected into the manifold and through the fluid transfer ports fully occupies each of the said sealing channels and is fused with the materials of said ducts and coupling members.

11. A ducting assembly comprised of a multiplicity of parallel passages and with opposite male and female end portions adapted to be projected one into the other for mechanical-hermetic joinder, and including, at least two parallel duct members of tubular cross section and each having inner and outer walls, a multiplicity of coupling members of tubular cross section and each having an inner wall and one engaged telescopically over each duct member and bonded thereto with a portion thereof projecting from the terminal end of the duct member, the said projecting portion of the coupling member forming a female receiver for the opposed terminal male end portion of a complementary duct member of a like ducting assembly with an annular interstice spacing between the inner wall of the coupling member and outer wall of the complementary duct member, a sealing channel formed by the configuration of the coupling member wall and complementary duct member wall at and in open communication with the interstice spacing therebetween, a saddle member with a seat receiving and positioning each coupling member and duct member telescopically engaged therein and having a manifold with a tube opening at each seat, and bonding material between the duct members and coupling members and injected as a fluid therebetween via a fluid transfer port through each coupling member opening from the manifold tube at the seats and into the sealing channels and subsequently hardened between each coupling member and complementary duct member telescopically entered therein.

12. The ducting assembly as set forth in claim 11 wherein the liquid bonding material injected into the manifold and through the fluid transfer ports fully occupies each of said sealing channels.

13. The ducting assembly as set forth in claim 11 wherein the liquid bonding material combined with a setting agent injected into the manifold and through the fluid transfer ports fully occupies each of said sealing channels and subsequently hardens and adheres to and between each coupling member and duct when telescopically engaged therein.

14. The ducting assembly as set forth in claim 11 wherein the duct members and coupling members are made of fuseable materials and the liquid bonding material injected into the manifold and through the fluid transfer ports fully occupies each of the said sealing channels and is fuseable with the materials of the duct and coupling members.

15. The ducting assembly as set forth in claim 11 wherein the duct members and coupling members are made of fuseable materials and the liquid bonding material combined with a setting agent injected into the manifold and through the fluid transfer ports fully occupies each of the said sealing channels and is fused with the material of the duct and coupling members.

16. The ducting assembly as set forth in claim 11 wherein the tubes opening from the manifold at each seat in the saddle member project into the fluid transfer port opening there into and indexes the rotative positions of the duct member seated therein.

17. The ducting assembly as set forth in claim 11 wherein the manifold is of electrically resistive material to heat the surrounding area when electrical current is passed therethrough.

18. The ducting assembly as set forth in claim 11 wherein the saddle member is of modular form comprised of pairs of seats for the positioned reception of coupling members and duct members telescopically engaged.

19. The ducting assembly as set forth in claim 11 wherein the saddle member is of modular form comprised of oppositely faced pairs of seats for the positioned reception of coupling members and duct members telescopically engaged therein.

20. The ducting assembly as set forth in claim 11 wherein the saddle member is of modular form comprised of oppositely faced pairs of seats for the positioned reception of coupling members and duct members telescopically engaged therein, wherein the tubes opening from the manifold at each seat in the saddle member project into the fluid transfer port opening there into and indexes the rotative position of the duct member seated therein, and wherein the duct members and coupling members are made of fuseable materials and the liquid bonding material combined with a setting agent injected into the manifold and through the fluid transfer ports fully occupies each of the said sealing channels and is fused with the materials of said ducts and coupling members.

* * * * *